June 25, 1929.  W. H. MANNING  1,718,656
TORSION BALANCER
Filed April 2, 1928
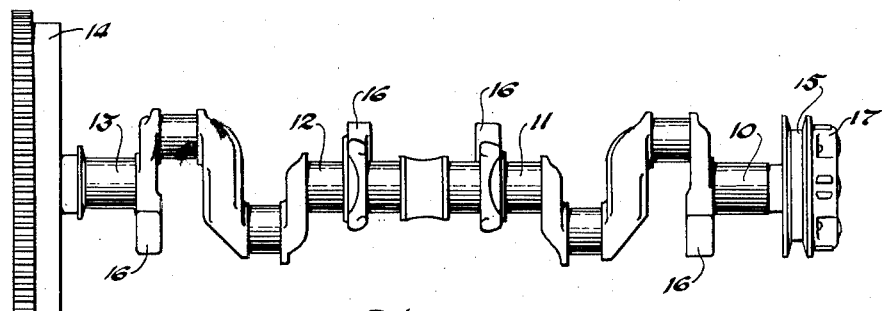
Fig. 1
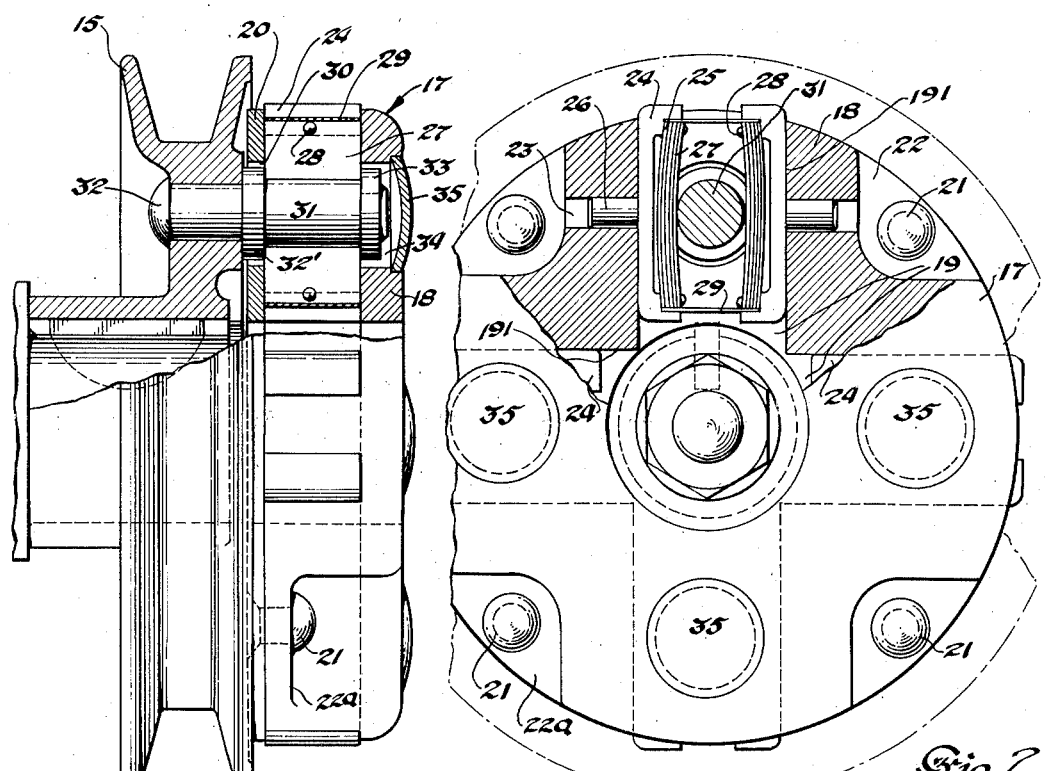
Fig. 3
Fig. 2
Inventor
William H. Manning
By
Blackmore, Spencer & Finch
Attorneys Patented June 25, 1929.

1,718,656

UNITED STATES PATENT OFFICE.

WILLIAM H. MANNING, OF PONTIAC, MICHIGAN, ASSIGNOR, BY MESNE ASSIGNMENTS, TO PACKARD MOTOR CAR COMPANY, OF DETROIT, MICHIGAN, A CORPORATION OF MICHIGAN

TORSION BALANCER.

Application filed April 2, 1928. Serial No. 266,799.

This invention relates to means for minimizing torsional vibrations in shafts of engines or other machines.

When a shaft is elastic and has at one end a mass with a comparatively large moment of inertia, such as a flywheel (as in the case of internal combustion motor vehicle engines), the shaft assembly has a particular torsional frequency of its own. Any periodical variation of torque applied to the shaft (as by the pistons) in harmony with its frequency will set up torsional vibrations due to resonance. If these vibrations are not curbed, disagreeable or serious results may occur owing to the violence of the vibrations.

It is an object of this invention to eliminate or minimize vibrations of a shaft due to resonance by an elastically attached mass having no rubbing engagement with the shaft; and to accomplish this by means of an attachment applicable to any form of shaft and requiring no modifications in the balance of the shaft.

It is a further object to simplify the construction of torsion balancers of elastically coupled type to facilitate quantity production and assembly.

This invention consists in the peculiar combination of a shaft with a torsion balancer comprising a mass balanced and having a moment of inertia about the axis of the shaft and supported out of rubbing contact with it and its fixtures by leaf springs, to suppress the vibrations of the shaft at periods of resonance. It also consists in a torsional balancer comprising a mass having removable spring retainers or holders and leaf springs adapted to be quickly assembled in the balancer.

The invention also consists of the several combinations and elements more particularly set forth in the ensuing description, defined in the appended claims, and illustrated in the accompanying drawings, in which:

Fig. 1 is an elevation of an engine crank shaft having a flywheel fixed at one end and a balancer made in accordance with this invention at the other end;

Fig. 2 is a front face view of the balancing mass partly in section, viewed from the front along the axis;

Fig. 3 is an elevation partly in section of a balancer assembly mounted on a fan pulley, viewed transversely of the axis.

In Fig. 1, there is shown a six-throw crank shaft having four journals designated from front to rear by numerals 10, 11, 12 and 13. A flywheel 14 is secured rigidly to the rear end of the shaft as usual, and a fan pulley 15 is fixedly keyed to the front end of the shaft. Counterweights 16 effect its dynamic balance. The torsion balancer, indicated in general by 17, is disposed in front of the fan pulley 15.

One embodiment of a balancing mass constructed according to this invention comprises a body 18 having pairs of abutment surfaces 19¹ symmetrically disposed about its axis, said surfaces being shown as the opposing sides of grooves 19 extending radially in the body. These grooves may be formed by planing, milling or any other method and as the grooves are straight the operations are simple. The grooves may be machined from the back of the body 18. When the balancer is completed and the parts assembled the open sides of said grooves are closed by a rear plate 20 secured to the body 18 by rivets 21. The opposing side faces 19¹ of the respective grooves constitute abutments for spring retainers designed to hold spring units in proper relation to the shaft and balancing mass. For convenience the body 18 may be formed with notches or corner-like spaces 22 leaving webs 22ª through which the securing rivets may be passed. The corner-like spaces also facilitate drilling holes 23 which cooperate with the spring retainers to locate and hold the latter in place.

Each spring retainer 24 is of shallow U-form provided with ledges or spring seats 25 at each end and on the opposite side with a centrally disposed positioning pin 26 adapted to be seated in a hole 23. In the illustrated embodiment there are eight of these spring retainers 24, two in each radial groove 19. Each spring retainer receives a leaf spring 27 with its ends resting on the ledges or seats 25. Each leaf spring is preferably composed of a plurality of layers which may be secured together in any suitable way, as by small rivets 28. A pair or set of two leaf springs is located in each radial groove, and the springs of a pair are preferably united by a very thin strip of metal 29, to facilitate assembly and protect the spring cavities from dirt and dust when assembled in the balancer.

When the spring retainers and springs have been assembled with the balancing mass 18, rear cover plate 20 may be secured to the rear face of the balancer body by the rivets 21. The cover plate is provided with orifices 30 to provide for the passage of spring abutments 31 rigid with the shaft and which, as shown, may be studs fixed to the fan pulley 15, which may, for purposes of this invention be considered as a flange, disc or other transverse fixture rigid with the crank shaft.

Each abutment stud 31 projecting from the front face of pulley 15 passes through an orifice in the cover plate 20, into position between two springs 27 of a pair, placing them under tension and supporting the balancer free of frictional engagement with the shaft or parts rigid therewith, the front end extending into orifices 34 in the front part of mass 18. As the springs and studs are symmetrically spaced around the axis, some springs trending in directions crosswise of others, the balancing mass is held by them so that no lateral displacement can occur, rendering a retaining bearing unnecessary, and thus eliminating rubbing friction between the shaft and its fixtures and the balancing mass.

The studs 31, which constitute spring abutments fixed to the shaft in this embodiment, have an intermediate spring abutting portion and a smaller shank that is riveted as at 32 to the pulley 15 or other supporting fixture. There is a spacing collar 32' interposed between the shoulder formed by the larger diameter and the front face of the pulley; a spacing collar 33 on the front end of the stud may be secured by fitting it over a reduced end on the stud and riveting it in place. Collars 32 and 33 are sufficiently smaller than the orifices 30 in plate 20, and 34 in body 18 to permit ample latitude for vibration of the body. Orifice 34 may be closed by plug 35 in order to exclude dust.

The machining operations upon this balancer are simple. There is no rubbing engagement between it and the shaft or parts rigid with it. It is easy to assemble.

Although in the preferred embodiment illustrated, four sets of springs and abutment pins are used spaced angularly 90°, it will be apparent that the springs need not be disposed in sets of two and need not be angularly displaced 90°, as long as the resultant of the spring forces hold the balancer centered about the axis and elastic force exerted in one sense is opposed by substantially equal elastic force exerted in the opposite sense. The specific details of construction illustrated and described as appurtenant to a preferred form are not to be considered as limitations upon the scope of the invention claimed.

What I claim is:

1. In means for controlling torsional vibrations, the combination of a torsionally elastic shaft, spring abutments rigid with said shaft, a balancing mass having surfaces opposed to said abutments, detachable spring retainers on said surfaces, and leaf springs in said spring retainers, the several springs and abutments being disposed so that rotation of the balancing mass is opposed elastically in both directions.

2. Means as defined in claim 1, in which the detachable spring seats on the balancing mass are provided with pins seated in holes formed in the mass.

3. In means for controlling torsional vibrations, the combination of a torsionally elastic shaft, spring abutments rigid with said shaft, a balancing mass having radial grooves symmetrically disposed at different angles, a pair of opposed spring retainers and leaf springs in each groove, the springs of each pair being separated by one of the abutments rigid with the shaft.

4. In means for controlling torsional vibrations, a torsion balancer comprising a balancing mass having an open ended spring receiving cavity, a pair of leaf springs in said cavity, and a protecting strip joining the ends of the springs of a pair.

5. In means for controlling torsional vibrations, a shaft and a fixture thereon, said fixture having abutments projecting parallel with the axis, a balancing mass comprising a body having radial open ended grooves, spring seats on the balancing mass within the grooves, opposed leaf springs separated by one of said abutments, and a cover plate closing the grooves at the rear, but provided with orifices to permit the free passage of the shaft abutments.

6. In means for controlling torsional vibrations, a balancer adapted to be elastically connected to a shaft, said balancer comprising a body having crossing open ended grooves, the opposed sides of each groove being perforated, and shallow U-shaped spring retainers each having end spring seats and a retaining pin adapted to be seated in a perforation of the groove.

In testimony whereof I affix my signature.

WM. H. MANNING.

CERTIFICATE OF CORRECTION.

Patent No. 1,718,656.                                    Granted June 25, 1929, to

WILLIAM H. MANNING.

It is hereby certified that error appears in the printed specification of the above numbered patent requiring correction as follows: Page 2, line 52, after the sentence "It is easy to assemble." insert the words "Successive balances of identical characteristics may be easily produced."; and that the said Letters Patent should be read with this correction therein that the same may conform to the record of the case in the Patent Office.

Signed and sealed this 22nd day of October, A. D. 1929.

(Seal)

M. J. Moore,
Acting Commissioner of Patents.